Feb. 5, 1935. J. J. MIZER 1,990,242
REAR AXLE SUPPORT FOR AUTOMOBILE HOISTS
Filed Aug. 13, 1934    3 Sheets-Sheet 3
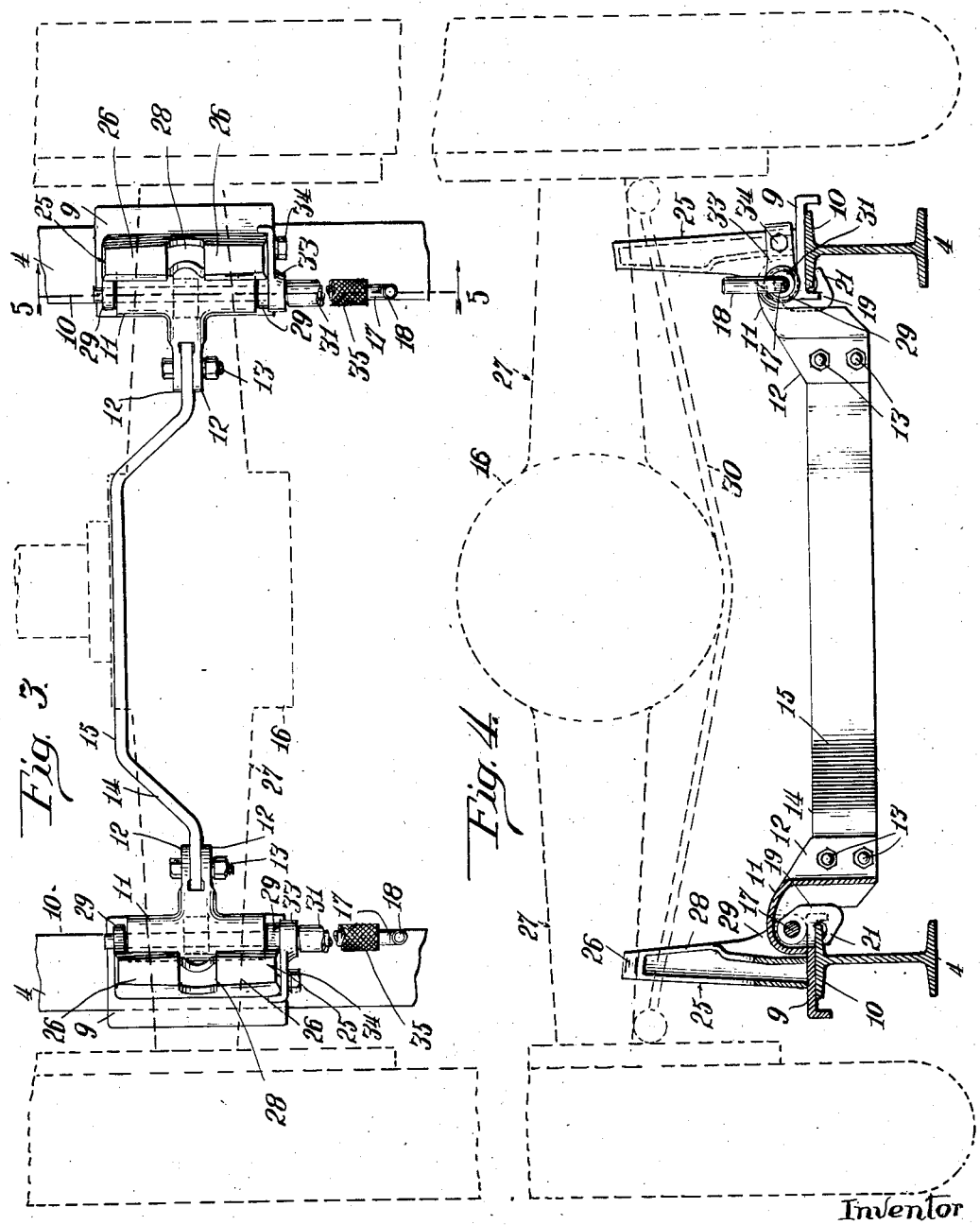
Inventor
Joseph J. Mizer
By Barnett & Truman
Attorneys Patented Feb. 5, 1935

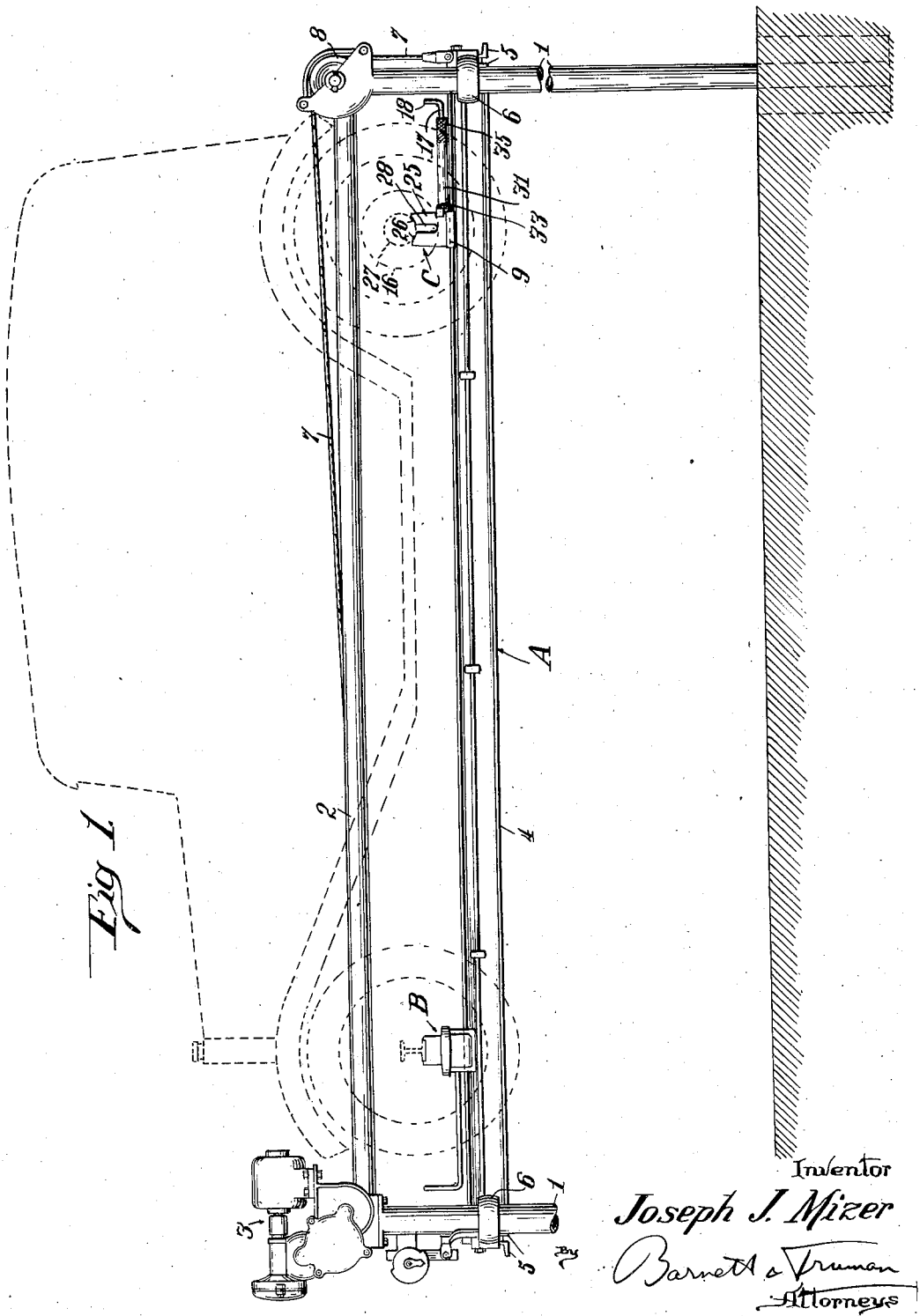

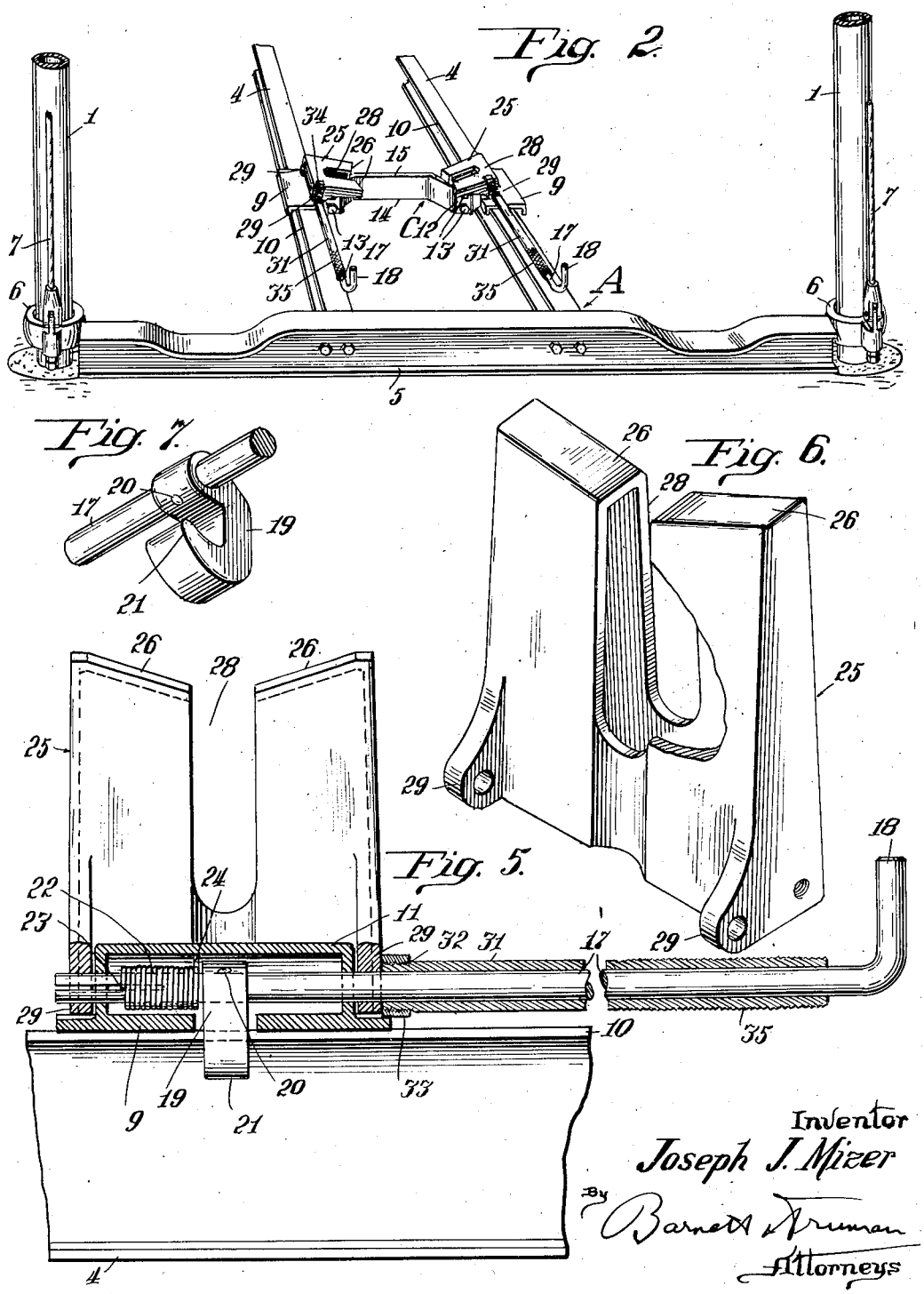

1,990,242

UNITED STATES PATENT OFFICE 1,990,242

REAR AXLE SUPPORT FOR AUTOMOBILE HOISTS

Joseph J. Mizer, Racine, Wis., assignor to Walker Manufacturing Company, Racine, Wis., a corporation of Wisconsin Application August 13, 1934, Serial No. 739,558

15 Claims. (Cl. 254—89)

This invention relates to certain new and improved car supports for automobile hoists, and more particularly to an improved device incorporated in the hoisting mechanism for engaging beneath and supporting the rear axle structure of the automobile chassis.

Certain forms of hoisting devices designed for raising an automobile bodily and supporting it in an elevated position so that access may be conveniently had to the under portions of the car for greasing or repairing the same, comprise a carriage structure adapted to engage beneath and support the car between the wheels, this carriage usually embodying a pair of similar spaced apart parallel beams, suitably tied together at intervals and extending longitudinally beneath the car. Suitable devices are provided, usually adjustable longitudinally of the beams, to engage beneath and support the respective front and rear axle assemblies and thus support the automobile. The front end portion of the car may be supported by the front axle resting directly upon the beams, or suitable blocks or supports may be interposed between the beams and some portion of the front axle assembly. The rear end of the car is usually supported by a cradle device which bridges the two beams, the differential housing or some central portion of the rear axle assembly resting in this cradle. In some new types of cars, the differential housing is not positioned centrally of the car, that is midway the length of the rear axle, and the cradle would not be in position to receive this housing, or if it were properly positioned the car would not be balanced. It is therefore desirable to support the car from portions of the axle housings intermediate the differential and the wheels.

According to the present invention, platforms are provided which are adjustable longitudinally of the carriage-beams, and vertically extending supporting blocks rest at their lower ends on these housings and are adapted to support the axle structure at their upper ends. Since truss rods or other structures are sometimes positioned beneath the axle housing, the supporting blocks are vertically recessed so as to form yokes which may extend upwardly about such rods and engage the overlying axle housing. Since some modern cars have low hanging parts (particularly in the front axle assembly) which would be engaged by these vertically extending supporting blocks when the car is run into or out of position over the hoisting carriage, the blocks are pivotally mounted so that they may be swung down to an ineffective position to permit the automobile to be run into or out of the hoist without obstruction. A supporting device of this type is adapted for almost universal use with any type of car now in service.

The principal object of this invention is to provide an improved car support for automobile hoists, such as briefly described hereinabove and disclosed more in detail in the specifications which follow.

Another object is to provide a supporting device of this type which is conveniently adjustable longitudinally of the hoist carriage and easily removable therefrom.

Other objects and advantages of this invention will be more apparent from the following detailed description of one approved form of mechanism constructed and operating according to the principles of this invention.

In the accompanying drawings:

Fig. 1 is a side elevation of one type of automobile hoist equipped with this improved car support, the outlines of an automobile supported by the hoist being indicated in dotted lines.

Fig. 2 is a perspective view of part of the rear end portion of this hoist.

Fig. 3 is a plan view of the improved supporting assembly.

Fig. 4 is an elevation of the assembly shown in Fig. 3, part of the left hand portion of the assembly being shown in vertical section.

In Figs. 3 and 4 a portion of the supported car structure is shown in dotted lines.

Fig. 5 is an enlarged vertical section, taken substantially on the line 5—5 of Fig. 3.

Fig. 6 is a perspective view, partially broken away, of one of the supporting blocks.

Fig. 7 is a perspective view of one of the hooks for holding the supporting device in position on the beams.

Referring first more particularly to Figs. 1 and 2, the automobile hoist here shown is of the type disclosed more in detail and claimed in the patent to Walker 1,958,026 granted May 8, 1934. This apparatus comprises four separate upright posts or standards 1, independently supported adjacent the corners of a clear space into or through which the automobile may be run. The two posts 1 at each side of the supporting frame are connected at their upper ends by a longitudinally extending brace or pipe-section 2, and the upper ends of the two posts at the front of the frame are connected by a transverse shaft carrying the hoisting drums which are driven by the motor assembly indicated at 3. The load-supporting carriage indicated generally at A comprises two parallel longitudinally extending I-beams 4 which are connected adjacent their ends by the transverse beams 5 having guide loops 6 at their ends which slidably engage the posts or uprights 1. A pair of cables 7 are anchored at their lower ends to the end portions of the rear cross-beam 5, these cables extending upwardly and over direction sheaves 8 and thence horizontally adjacent the braces 2 and are secured to the winding mechanism. A similar pair of cables extend downwardly directly from the winding mechanism and are secured to and support the front end of the carriage. The carriage A is raised or lowered to raise or lower the automobile by simultaneously drawing in or paying out the several cables 7. The spaced apart beams 4 extend longitudinally beneath the car chassis, between the wheels, as indicated in Figs. 1, 3 and 4. Supporting mechanisms, indicated generally at B and C, are mounted on the beams 4 for supporting the front and rear end portions of the car respectively (see Fig. 1). In order to accommodate cars of different lengths, one or the other of the devices B and C, preferably both of them, are adjustable longitudinally of the beams 4. The supporting assembly B may be of any approved type for engaging beneath and supporting some portion of the front axle assembly, the structure shown by way of example in Fig. 1 being of the type disclosed more in detail and claimed in my copending application Serial No. 712,543, filed February 23, 1934, now Patent No. 1,968,416, granted July 31, 1934. The improved supporting device C for the rear-axle assembly forms the particular subject matter of this present invention.

It might be here mentioned that although one approved form of hoisting device has been briefly described by way of example, there are other forms of hoists now in use which employ hydraulic rams or other motor means for raising and lowering the car supporting carriage. Many of these hoisting devices have a carriage comprising a pair of spaced apart parallel beams, such as the beams 4 herein disclosed, and the specific supporting mechanism now to be described might be used with any of these carriages as well as with the particular form of hoist herein disclosed by way of example.

The improved supporting structure C comprises a pair of similar platforms 9, each preferably in the form of a single casting shaped to fit over and rest upon the upper horizontal flange 10 of the I-beam 4. At its inner side this casting is formed with a housing extension 11 and with a pair of ears 12 between which is bolted or otherwise rigidly secured at 13 one end of a bar or truss member 14 which extends transversely between the I-beams 4 and serves to tie the two platforms 9 rigidly together. As best shown in Fig. 3, this cross-bar 14 is bowed laterally at 15 intermediate its ends so as to permit free access to the drain plugs or cover plates of the differential housing, indicated generally at 16.

A pull-rod 17 (one for each platform 9) has one end portion extending through and pivotally mounted in the housing 11 (see Fig. 5). This pull-rod extends parallel to and above the adjacent I-beams 4 and is provided at its outer end with a handle 18, by means of which the platform may be moved longitudinally of the I-beam. A hook 19 is secured by pin 20 on the rod 17 within the housing 11, the lower end 21 of this hook normally engaging beneath the adjacent flange 10 of the I-beam (see Fig. 4) to hold the platform down on the beam while permitting longitudinal movement of the platform on the beam. A torsion spring 22 surrounds a portion of rod 17 and is anchored at one end 23 to the rod, the other end 24 of the spring being anchored to a portion of the fixed housing 11. This spring 22 tends to hold the hook in locking engagement with the I-beam flange as shown in Fig. 4. By swinging the handle 18 in the proper direction to partially rotate the rod 17, the hook 19 may be released from engagement with the I-beam flange, thus permitting the platform and the supporting structure carried thereby to be lifted or removed from the beam. The spring 22 tends to return the hook to locking position as soon as the handle 18 is released.

The supporting block 25 (one for each platform) is preferably made in the form of a hollow casting having a rather broad supporting base adapted to rest upon the platform 9 and tapering upwardly to the cradle or rest 26 which engages beneath and supports the axle housing. This axle housing is indicated in dotted lines at 27 in Figs. 3 and 4. Preferably the block 25 is cut out or recessed centrally, as indicated at 28, so that the upper portion of the block will be in the form of a yoke adapted to extend upwardly about, without engaging therewith, any rod or similar device which may be positioned beneath the axle housing, as indicated at 30 in Fig. 4. Preferably the upper surfaces 26 of the two yoke arms (which constitute the cradle or rest) slope inwardly toward the recess 28. The supporting block is provided on its inner side adjacent its base with one or more laterally extending ears 29 which are pivotally mounted on the pull rod 17. As here shown, there are two of these ears 29 which are mounted on the outwardly extending end portions of rod 17 at the sides of housing 11. It will thus be apparent that each of these axle-supporting blocks 25 may be independently swung up or down, to the effective axle-supporting position shown in Figs. 3, 4 and 5, or to the substantially horizontal ineffective position shown in Fig. 2.

It is sometimes necessary, or at least desirable, to swing the blocks 25 from vertical to horizontal position, or vice-versa, while the blocks are in position beneath the axle, that is, under the car where they are not easily accessible. Therefore means are provided for swinging the blocks, these means being operable from a position beyond the end of the car.

A tubular member or pipe-section 31 fits rotatably about each pull-rod 17, the inner end of this member being threaded at 32 into a crank-arm 33 which is bolted at 34 to one end portion of block 25. The outer end of tubular member 31, which extends to a location adjacent the handle 18, is provided with a knurled handle-portion 35 so that the member may be easily gripped and rotated to swing the block to or from its effective vertical position on platform 9.

The supporting assembly C will normally remain in position on the hoisting carriage A, but when the carriage is lowered and an automobile is being run into or out of position over the carriage, the blocks 25 will be swung down to the ineffective position shown in Fig. 2 so as not to engage with any low-hanging portion of the automobile structure. The entire supporting assembly C is moved longitudinally of the beams 4 into proper position beneath the rear axle structure by means of the handles 18 which are easily accessible from the end of the hoist. While the assembly C is being adjusted longitudinally of the beams the hooks 19, which normally clamp against the lower surface of the flanges 10 of the beams 4, may be partially released by turning handles 18 in the proper direction. The blocks 25 may then be swung up to effective axle-supporting position by rotating the handles 35. As the carriage is elevated the blocks 25 will be lifted into engagement with the axle housings 27, the recesses 28 in the yokes passing upwardly about any rods 30 that may be positioned beneath the axle. It will now be apparent that this device is of a universal character adapted to support many different types of rear-axle construction, regardless of the form or positioning of the differential housing.

By rotating the handles 18, the hooks 19 may be entirely released from beams 4 and the entire assembly C lifted from the carriage. These hooks are normally in engagement with the upper flanges of the I-beams so as to clamp the platforms in selected position and also to hold the assembly down on the beams and prevent tilting in case the load is not properly distributed.

Since the supporting block 25, when in upright position, is directly above the beam 4, the crossbar 14 might be omitted and the two platform assemblies operated as independent units. It is preferable, however, to tie the units together by means of this bar 14 thus providing a more rigid and non-tiltable unit that may be easily moved into or out of proper position beneath the axle-structure. By offsetting or bowing the bar at 15, it does not interfere with ready access to the differential mechanism.

I claim:

1. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, and a pair of supporting blocks one for each platform, each block being formed at its lower end with a supporting base adapted to rest upon the platform and being formed at its upper end with a rest adapted to carry a portion of an axle structure, a pair of pull-rods one for each platform, the rod being mounted at one end in the platform and extending substantially parallel with the adjacent beam and formed with a handle at its other end, the block having a laterally extending ear adjacent its base, the ear being pivoted on the pull-rod so that the block may be swung down to an ineffective position.

2. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, and a pair of supporting blocks one for each platform, each block being formed at its lower end with a supporting base adapted to rest upon the platform and being formed at its upper end with a rest adapted to carry a portion of an axle structure, a pair of pull-rods one for each platform, one end portion of the rod being pivotally mounted in the platform, the rod extending parallel with the adjacent beam and provided with a handle at its other end, a hook mounted on the rod and positioned to engage beneath a portion of the beam to hold the platform down on the beam, a spring for holding the hook in effective position, the hook being disengaged by a turning movement of the rod in opposition to the spring, the block having a laterally extending ear adjacent its base, the ear being pivoted on the pull-rod so that the block may be swung down to an ineffective position.

3. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, a pair of supporting blocks one for each platform, each block being formed at its lower end with a supporting base adapted to rest upon the platform and being formed at its upper end with a rest adapted to carry a portion of an axle structure, each block being formed with a laterally extending ear adjacent the base, means for pivotally attaching the ear to the platform so that the block may be swung down to an ineffective position, and means extending from each block substantially parallel to the adjacent beam and operable from a position remote from the platform to swing the block to or from its vertical position upon the platform.

4. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, a pair of supporting blocks one for each platform, each block being formed at its lower end with a supporting base adapted to rest upon the platform and being formed at its upper end with a rest adapted to carry a portion of an axle structure, a pair of pull-rods one for each platform, one end portion of the rod being pivotally mounted in the platform and extending substantially parallel with the adjacent beam and formed with a handle at the end remote from the platform, a hook mounted on the rod and positioned to engage beneath a portion of the beam to hold the platform down on the beam, a spring for holding the hook in effective position, the hook being disengaged by a turning movement of the rod in opposition to the spring, the block having a laterally extending portion adjacent its base pivoted on the pull-rod so that the block may be swung down to an ineffective position, and a tubular member fitted rotatably about the rod and secured at one end to the block, the other end being formed with a handle portion positioned adjacent the handle on the rod whereby the block may be swung to or from effective position.

5. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, a pair of supporting blocks one for each platform, each block being formed at its lower end with a supporting base adapted to rest upon the platform and being formed at its upper end with a rest adapted to carry a portion of an axle structure, the upper portion of the block being vertically recessed to form a yoke adapted to extend about a rod positioned beneath the axle structure, each block being formed with a laterally extending ear adjacent the base, means for pivotally attaching the ear to the platform so that the block may be swung down to an ineffective position, and means extending from each block substantially parallel to the adjacent beam and operable from a position remote from the platform to swing the block to or from its vertical position upon the platform.

6. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, and a pair of supporting blocks one for each platform, each block being formed at its lower end with a supporting base adapted to rest upon the platform and being formed at its upper end with a rest adapted to carry a portion of an axle structure, the upper portion of the block being vertically recessed to form a yoke adapted to extend about a rod positioned beneath the axle-structure, a pair of pull-rods one for each platform, one end portion of the rod being pivotally mounted in the platform, the rod extending parallel with the adjacent beam and provided with a handle at its other end, a hook mounted on the rod and positioned to engage beneath a portion of the beam to hold the platform down on the beam, a spring for holding the hook in effective position, the hook being disengaged by a turning movement of the rod in opposition to the spring, the block having a laterally extending ear adjacent its base, the ear being pivoted on the pull-rod so that the block may be swung down to an ineffective position.

7. In combination with an automobile hoist comprising a pair of spaced apart beams extending longitudinally beneath the automobile, a means for supporting an end portion of the automobile comprising a pair of similar platforms adapted to rest slidably upon the respective beams, a member extending transversely between the beams and secured to and rigidly connecting the platforms, and a pair of supporting blocks one for each platform, each block being formed at its lower end with a supporting base adapted to rest upon the platform and being formed at its upper end with a rest adapted to carry a portion of an axle structure, a pair of pull-rods one for each platform, one end portion of the rod being pivotally mounted in the platform, the rod extending parallel with the adjacent beam and provided with a handle at its other end, a hook mounted on the rod and positioned to engage beneath a portion of the beam to hold the platform down on the beam, a spring for holding the hook in effective position, the hook being disengaged by a turning movement of the rod in opposition to the spring, the block having a laterally extending ear adjacent its base, the ear being pivoted on the pull-rod so that the block may be swung down to an ineffective position.

8. In combination with an automobile hoist comprising a pair of spaced apart beams extending longitudinally beneath the automobile, a means for supporting an end portion of the automobile comprising a pair of similar platforms adapted to rest slidably upon the respective beams, and a member secured to and rigidly connecting the platforms, each platform comprising a housing adjacent one side thereof, a pull-rod extending through the housing and pivotally mounted in the walls thereof, a hook secured to the rod within the housing, a spring positioned to swing the rod and hook so that the hook will engage beneath a portion of the beam and hold the platform down on the beam, a block having a supporting base at its lower end adapted to rest upon the platform and formed at its upper end with a rest to receive and carry a portion of an axle-structure, the block having a pair of laterally extending ears adjacent the base, the ears overlapping opposite ends of the housing and being pivotally mounted on the pull-rod.

9. In combination with an automobile hoist comprising a pair of spaced apart beams extending longitudinally beneath the automobile, a means for supporting an end portion of the automobile comprising a pair of similar platforms adapted to rest slidably upon the respective beams, and a member secured to and rigidly connecting the platforms, each platform comprising a housing adjacent one side thereof, a pull-rod extending through the housing and pivotally mounted in the walls thereof, a hook secured to the rod within the housing, a spring positioned to swing the rod and hook so that the hook will engage beneath a portion of the beam and hold the platform down on the beam, a block having a supporting base at its lower end adapted to rest upon the platform and formed at its upper end with a rest to receive and carry a portion of an axle-structure, the upper portion of the block being vertically recessed to form a yoke adapted to extend about a rod positioned beneath the axle-structure, the block having a pair of laterally extending ears adjacent the base, the ears overlapping opposite ends of the housing and being pivotally mounted on the pull-rod.

10. In combination with an automobile hoist comprising a pair of spaced apart beams extending longitudinally beneath the automobile, a means for supporting an end portion of the automobile comprising a pair of similar platforms adapted to rest slidably upon the respective beams, and a member secured to and rigidly connecting the platforms, each platform comprising a housing adjacent one side thereof, a pull-rod extending through the housing and pivotally mounted in the walls thereof, a hook secured to the rod within the housing, a spring positioned to swing the rod and hook so that the hook will engage beneath a portion of the beam and hold the platform down on the beam, a block having a supporting base at its lower end adapted to rest upon the platform and formed at its upper end with a rest to receive and carry a portion of an axle-structure, the block having a pair of laterally extending ears adjacent the base, the ears overlapping opposite ends of the housing and being pivotally mounted on the pull-rod, there being a handle at the remote end of the pull-rod for rotating the rod to release the hook, and a tubular member fitted rotatably about the rod, secured at one end to the block, and formed with a handle at the other end positioned adjacent the handle on the pull-rod.

11. In combination with an automobile hoist comprising a beam extending longitudinally beneath the automobile, a means for supporting a portion of the automobile from the beam comprising a platform adapted to rest slidably upon the beam, means for holding the platform on the beam, a block formed at its lower end with a base adapted to rest upon the platform and formed at its upper end with a rest adapted to receive and carry a portion of the automobile structure, a pull-rod mounted at one end in the platform and extending substantially parallel to the beam and formed with a handle at the end remote from the platform, the block having a laterally extending ear adjacent its base, the ear being pivoted on the pull-rod so that the block may be swung down to an ineffective position.

12. In combination with an automobile hoist comprising a beam extending longitudinally beneath the automobile, a means for supporting a portion of the automobile from the beam comprising a platform adapted to rest slidably upon the beam, a block formed at its lower end with a base adapted to rest upon the platform and formed at its upper end with a rest adapted to receive and carry a portion of the automobile structure, a pull-rod pivotally mounted in the platform adjacent one end and extending substantially parallel with the beam and formed with a handle at the end remote from the platform, a hook mounted on the rod and positioned to engage a portion of the beam, a spring for holding the hook in effective position, the hook being disengaged by rotating the rod in opposition to the spring, the block having a laterally extending ear adjacent its base, the ear being pivoted on the pull-rod so that the block may be swung down to an ineffective position.

13. In combination with an automobile hoist comprising a beam extending longitudinally beneath the automobile, a means for supporting a portion of the automobile from the beam comprising a platform adapted to rest slidably upon the beam and formed with a housing adjacent one side thereof, a pull-rod extending through the housing and pivotally mounted in the walls thereof, a hook secured to the rod within the housing, a spring positioned to swing the rod and hook so that the hook will engage beneath a portion of the beam and hold the platform down on the beam, a block having a supporting base at its lower end and adapted to rest upon the platform and formed at its upper end with a rest adapted to receive and carry a portion of an automobile, the block having a pair of laterally extending ears adjacent the base, the ears overlapping opposite ends of the housing and being pivotally mounted on the pull-rod.

14. In combination with an automobile hoist comprising a beam extending longitudinally beneath the automobile, a means for supporting a portion of the automobile from the beam comprising a platform adapted to rest slidably upon the beam, means for holding the platform on the beam, a block formed at its lower end with a base adapted to rest upon the platform and formed at its upper end with a rest adapted to carry a portion of the automobile structure, the block having an ear extending laterally therefrom adjacent its base, means for pivotally attaching the ear to the platform, and means extending from the block substantially parallel to the beam and operable from a position remote from the platform to swing the block to or from its vertical position upon the platform.

15. In combination with an automobile hoist comprising a beam extending longitudinally beneath the automobile, a means for supporting a portion of the automobile from the beam comprising a platform adapted to rest slidably upon the beam, means for holding the platform on the beam, a block formed at its lower end with a base adapted to rest upon the platform and formed at its upper end with a rest adapted to carry a portion of the automobile structure, a pull-rod pivotally mounted in the platform adjacent one end and extending substantially parallel with the beam and formed with a handle at the end remote from the platform, a hook mounted on the rod and adapted to engage a portion of the beam, a spring for holding the hook in effective position, the hook being disengaged by rotating the rod in opposition to the spring, the block having a laterally extending portion adjacent its base pivotally mounted on the rod so that the block may be swung down to an ineffective position, and a tubular member fitted rotatably about the rod and secured at one end to the block, the other end being formed with a handle portion positioned adjacent the handle on the rod whereby the block may be swung to or from effective position.

JOSEPH J. MIZER.